United States Patent [19]

Ciofalo

[11] Patent Number: 5,106,642
[45] Date of Patent: Apr. 21, 1992

[54] ROASTING SUPPORT FOR FOWL

[76] Inventor: Robert Ciofalo, 1494 Shore Dr., Apt. 12 A, Bronx, N.Y. 10465

[21] Appl. No.: 378,367

[22] Filed: Jul. 11, 1989

[51] Int. Cl.$^5$ .................... A23L 1/315; A47J 43/18
[52] U.S. Cl. .................... 426/509; 426/523; 99/419; 99/421 V; 99/426; 99/446; 211/13; D7/409
[58] Field of Search .................. 99/419, 421 HV, 426, 99/446, 449, 410, 450, 345, 346, 421 V, 401, 415, 418, 441; 211/126, 59.1, 70.1, 181, 13, 119; 426/523, 509

[56] References Cited

U.S. PATENT DOCUMENTS

| | | | |
|---|---|---|---|
| 2,587,133 | 2/1952 | Finizie | 99/419 |
| 3,053,169 | 9/1962 | Rappaport | 99/421 V |
| 3,392,665 | 7/1968 | Harnest | 99/426 |
| 3,598,611 | 5/1966 | Swetlitz | 426/523 |
| 4,127,060 | 11/1978 | Curtis | 99/419 |
| 4,380,190 | 4/1983 | Adamis | 99/419 X |
| 4,421,017 | 12/1983 | Ross | 99/426 X |

FOREIGN PATENT DOCUMENTS 3990 of 1886 United Kingdom ............ 99/421 V
18494 of 1893 United Kingdom ............ 99/421 V Primary Examiner—Harvey C. Hornsby
Assistant Examiner—Mark Spisich
Attorney, Agent, or Firm—Rodman & Rodman

[57] ABSTRACT

A roasting support for a disemboweled fowl that has openings at the head and tail ends, includes a base member that carries a generally conical, imperforate plug member adapted to sealingly engage one of the open ends of the fowl to retain fluids within the fowl during roasting. The roasting support also includes an elevated support member adapted to support the other open end of the fowl at a higher level than the first open end thereof so that fluids added to the interior of the fowl or generated during roasting of the fowl are retained within the fowl during such roasting. The method of roasting the fowl includes the steps of supporting the fowl in an oven with one of the openings plugged to prevent leakage of fluids from the interior of the fowl, while the other of the openings is at a higher elevation than the first opening, and applying heat to the fowl for a sufficient period of time to roast the fowl. Fluid can be added to the interior of the fowl before or during the heating step.

15 Claims, 3 Drawing Sheets

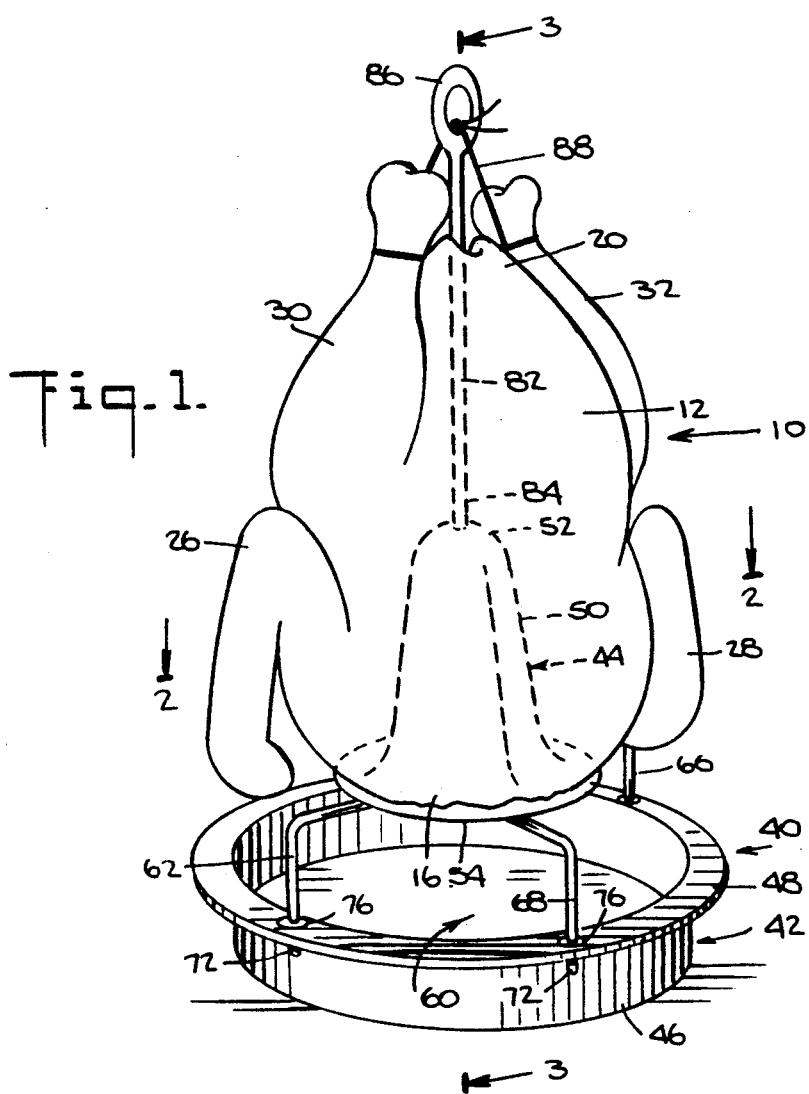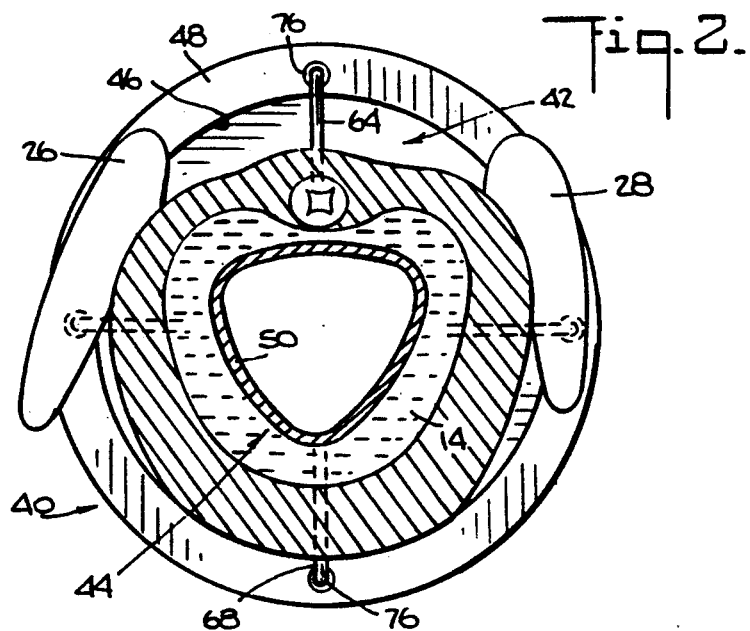

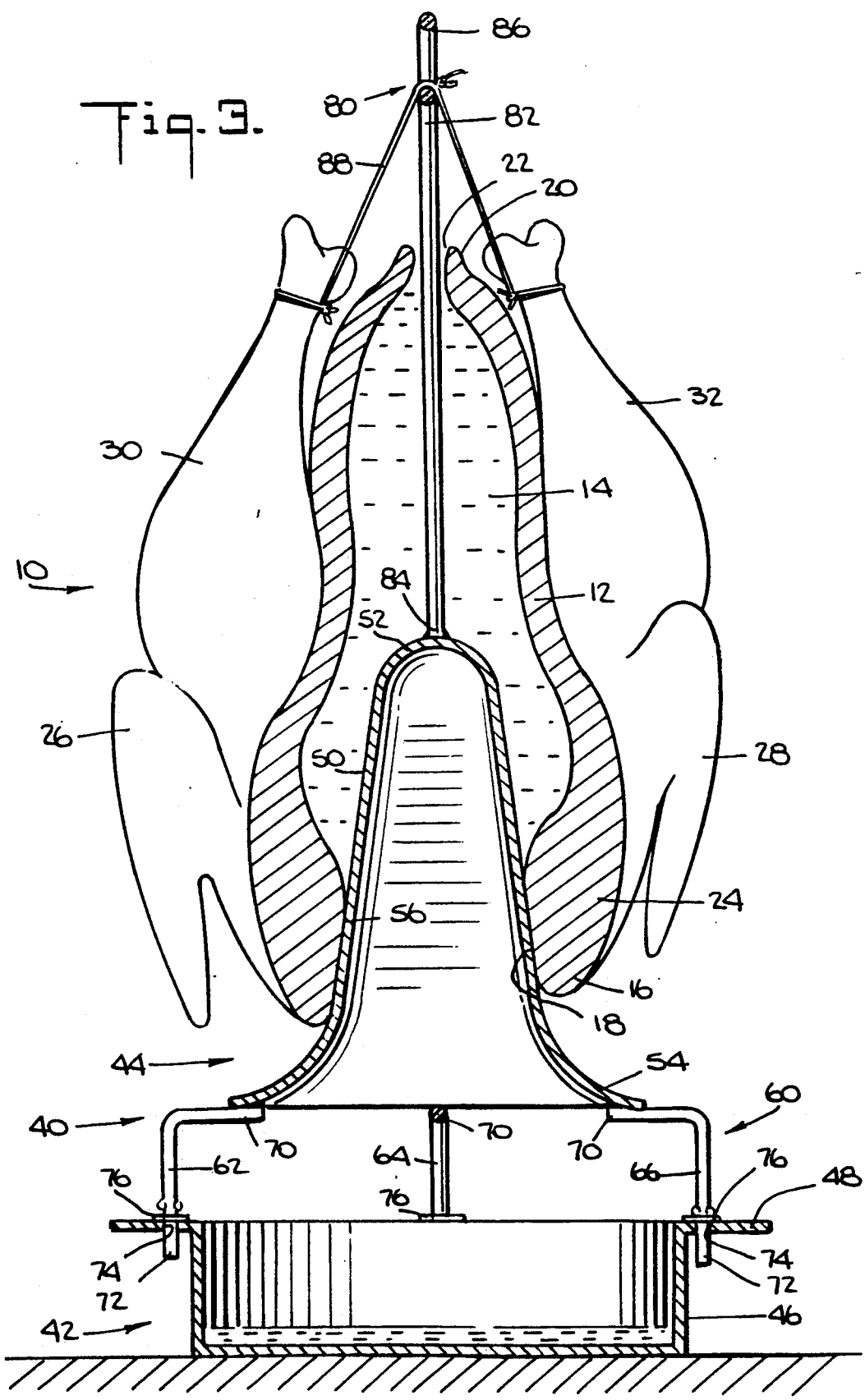

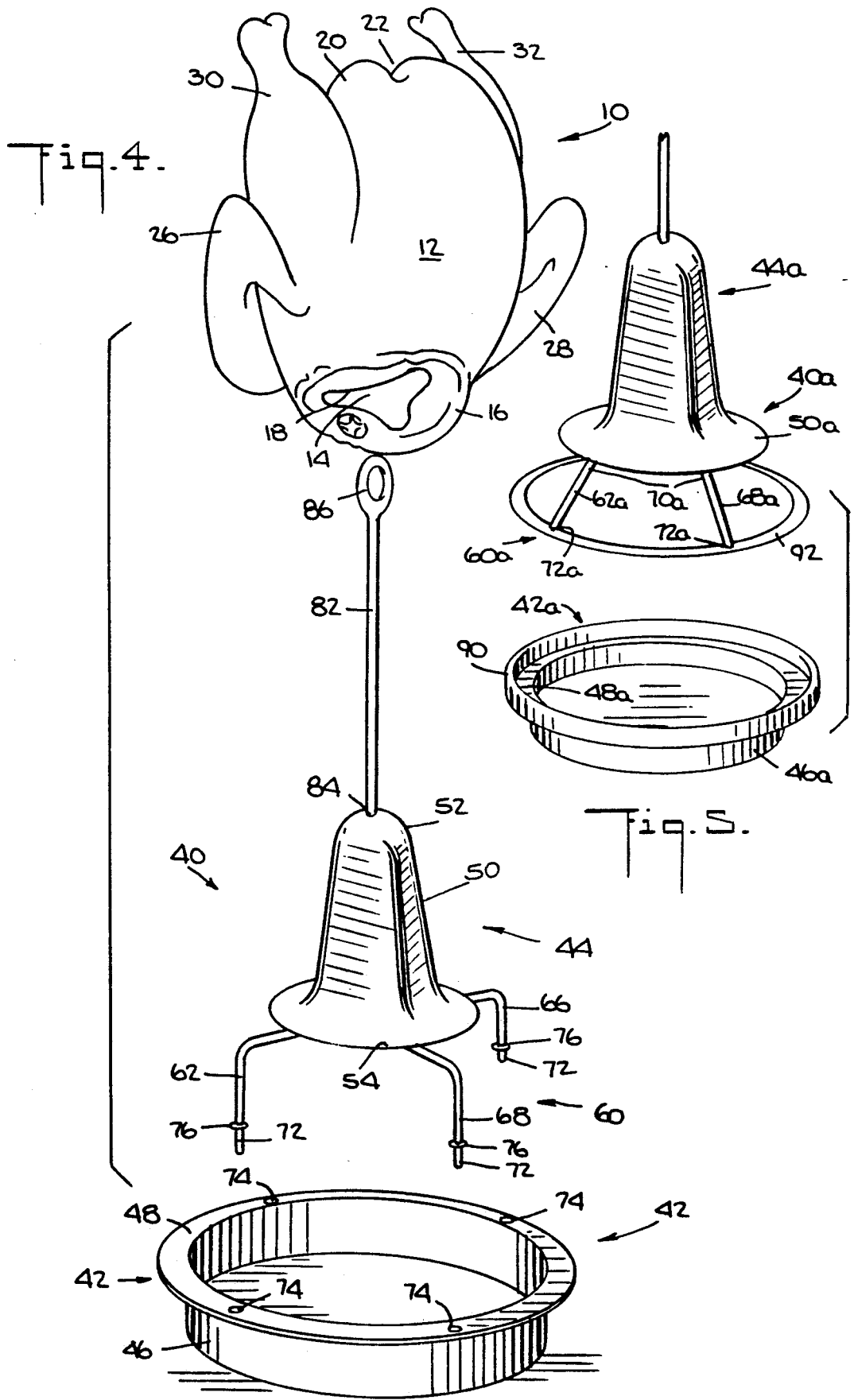

ROASTING SUPPORT FOR FOWL

This invention relates to a roasting support for fowl and more particularly to a roasting support which holds a fowl in an upright position in an oven and enables fluid to be retained within the fowl while it is being roasted.

BACKGROUND OF THE INVENTION

Chickens and other fowl such as turkeys, are usually prepared for roasting by being defeathered, disemboweled, and totally eviscerated with openings provided at the head and tail ends thereof. Such preparation of the fowl is often carried out by the purveyor or chicken supplier before the fowl is acquired by the consumer. In some instances the consumer will attend to such preparation after purchasing the fowl.

One preferred way of roasting fowl is to provide a roasting support or stand which holds the bird in a vertical or upright position above a supporting surface in an oven. Under this arrangement the outside skin surface of the chicken is uniformly exposed to the source of heat and localized overheating can be avoided. Such arrangement also assures maximum crispness of the exterior skin.

Numerous examples of supports which hold fowl in upright positions during roasting are shown in U.S. Pat. Nos. 3,392,665 to E. Harnest; 4,027,583 to Spanek et al.; 4,450,759 to J. P. Steibel; 4,633,773 to M. Jay, and 4,709,626 to G. J. Hamlyn.

In each of the foregoing patents a disemboweled fowl having openings at the head and tail ends is supported in a vertical position on a wire or other open framework. The supporting structure extends vertically into the fowl from a base that is adapted to rest on a flat surface within the oven. The vertical framework of the known roasting supports provide passageways through which any fluids added to or generated in the interior of the fowl during roasting drain onto a drip pan or other collecting device positioned beneath the fowl.

Heated air can also flow freely through the interior of the fowl. Free movement of heated air through the interior of the fowl during roasting often causes the interior section to dry out. Thus if moisture cannot be retained within the interior of the fowl during the roasting process, the meat may be unduly tough or otherwise lacking in flavor.

It is therefore a primary object of the present invention to provide a support for roasting fowl in an upright position which support includes provision therein for retaining within the fowl fluids added thereto or generated therein during the roasting process.

Another object of the present invention is to provide a method of roasting fowl in an upright position while retaining within the fowl during the roasting process fluid that is either added to the interior section prior to or during roasting or is generated within the bird during roasting.

Further objects and advantages of this invention will become apparent as the following description proceeds.

SUMMARY OF THE PRESENT INVENTION

In accordance with one embodiment of the invention, a roasting device for a disemboweled fowl that has openings at the head and tail ends supports the fowl and seals one of the openings. The roasting support comprises a base member and a generally conical, generally imperforate plug member having an apex portion, a base portion and a longitudinal axis. The plug member is carried by the base member, and the apex portion extends upwardly therefrom. The plug member is adapted to engage with one or the other of the head and tail openings in the fowl for sealing the opening to retain fluids within the fowl during roasting thereof. The roasting support also includes support means connected to the base and/or plug member. The support extends vertically higher than the plug member for supporting the fowl during roasting with one of the openings in the fowl at a higher elevation than the other opening. Thus fluids added to the interior of the fowl or generated during roasting of the fowl are retained within the fowl during such roasting.

In accordance with another aspect of the invention, a method of roasting a disemboweled fowl that has openings at the head and tail ends thereof is provided. The method comprises the steps of supporting the fowl in an oven with one of the openings plugged to prevent leakage of fluids from the interior of the fowl and with the other of the openings at a higher elevation than the first opening, and applying heat to the fowl for a sufficient period of time to roast the fowl. Fluid such as a broth, can be deposited in the fowl interior before or during roasting.

The invention accordingly comprises the constructions and method hereinafter described, the scope of the invention being indicated in the claims.

DESCRIPTION OF THE DRAWINGS

In the accompanying drawings,

FIG. 1 is a perspective view of a roasting support for a fowl incorporating one embodiment of the invention, and showing a fowl supported thereon;

FIG. 2 is a sectional view taken along the line 2—2 of FIG. 1;

FIG. 3 is an enlarged sectional view taken along the line 3—3 of FIG. 1;

FIG. 4 is an exploded perspective view, similar to FIG. 1, showing the fowl and the various elements of the roasting support separated but longitudinally aligned with one another; and, FIG. 5 is an exploded perspective view, similar to FIG. 4, but showing an alternate embodiment of the roasting support for fowl.

DETAILED DESCRIPTION OF THE INVENTION

Referring to FIGS. 1-4, a fowl, for example a chicken, is generally indicated by the reference number 10. The fowl 10 includes a hollowed out, disemboweled body portion 12 which encircles a central cavity 14 (FIG. 3). The body portion 12 includes a head end 16 having an opening 18 therein, and a tail end 20 having an opening 22 therein.

As is typical of fowl, the walls of the body portion adjacent the head end 16 are thicker and heavier, as shown at 24, than the walls of the body portion 12 adjacent the tail end 20. The body portion 12 of the fowl also contains wings 26 and 28 and legs 30 and 32.

The fowl 10 is supported during roasting on a roasting support or stand, shown generally at 40. As most clearly shown in FIG. 4, the stand 40 includes a base member, shown generally at 42, and a plug member, shown generally at 44. The base member 42 is preferably a generally circular, generally imperforate pan member 46 having a raised peripheral flange 48 thereon.

The plug member 44 includes a generally imperforate conical surface 50 having an apex portion 52 and a base portion 54. It will be noted that the opening 18 at the head end 16 of the fowl is generally triangular in cross section, as best seen in FIG. 4. The plug member 44 is thus preferably generally triangular in cross-sectional shape, as shown most clearly in FIG. 2, so that the conical surface 50 thereof will properly align with and provide a sealing seat for the opening 18.

Referring to FIG. 3, it will be seen that when the fowl 10 is mounted on the support 40 with the head end 16 in a downward orientation, the thickened wall portion 24 of the body 12 provides an elongated surface 56 that engages with the conical surface 50 of plug member 44 to effect a desired sealing of the opening 18 at the head end 16. Such seal enables the fowl to retain fluids in the body cavity 14 during roasting. It will also be noted that the size of a neck opening in a 20-pound turkey is not significantly different from that of a three-pound chicken. The plug member 44 is thus of a predetermined size and shape to assure the desired seal of the opening 18 for a particular size range of fowl. In essence the plug member 44 functions to provide a universal seal for a particular size range of fowl.

The plug member 44 is connected to the base member 42 by a bracket means, shown generally at 60, which serves to support the plug member above and generally in vertical alignment with the pan member 46. The bracket means 60 includes a plurality of bracket members 62, 64, 66 and 68 each of which is releasably attached to one or the other or both of the base member 42 and the plug member 44 to permit separation of the two members and to facilitate cleaning of such members.

In the embodiment shown in FIGS. 1-4, each of the bracket members 62-68 has one of its ends 70 fastened, for example by welding (FIG. 3), to the base 54 of plug member 44. The other end 72 of each of the bracket members 62-68 is releasably received in a corresponding aperture or opening 74 formed in the peripheral flange 48 of the base member 42. A collet or stop member 76 is provided adjacent the end portion 72 of each of the bracket members 62-68 to limit the depth to which the end portion 72 may penetrate the aperture 74 in the flange 48.

The pan 46 of base member 42 is preferably circular in plan and has a diameter (or minimum transverse dimension if other than circular) that is greater than the maximum transverse dimension of the base portion 54 of plug member 44 so that any fluids that drip from the exterior of the body 12 of the fowl during roasting will drain into the pan 46 of the base member.

The roasting support 44 is provided with a support means, shown generally at 80, which may be connected to one or the other of base member 42 and plug member 44, and extends vertically higher than the plug member 44 for supporting the fowl with one of its openings at a higher elevation than the other of its openings, during roasting.

In the preferred embodiment the support means 80 comprises an arm 82 that is fixed at an end 84 to the apex portion 52 of the plug member 44. The support means 80 is provided with a ring 86 opposite the end 84. The ring 86 and upper portion of the arm 82 are passed through the cavity 14 of the fowl when the fowl is assembled onto the roasting support 40. Preferably the arm 82 is installed in the cavity 14 with the opening 18 of the head end 16 downwardly oriented. The legs 30 and 32 of the fowl are then tied together by a suitable cord 88 that passes through the ring 86 and holds the fowl in proper, sealing position relative to the plug member 44.

Alternatively, the fowl may be assembled onto roasting support 40 with the tail end opening 22 down. In this case the wings 26 and 28 would be trussed together by the cord 88 that passes through ring 86, or if desired, separately trussed. Since the tail end opening 22 is generally larger than the head end opening, a correspondingly sized plug member 40 would be used to plug the tail end opening 22.

The foregoing roasting stand 40 facilitates roasting a disemboweled fowl that has openings at the head and tail end thereof by a method which includes the steps of supporting the fowl in an oven with one of the openings plugged to prevent leakage of fluids from the interior of the fowl and with the other of the openings at a higher elevation than the first opening. Heat is applied to the fowl for a sufficient period of time to roast the fowl. The amount of heating time varies according to the size of the fowl.

Preferably heated fluidic material, for example a broth made from giblets of the fowl, or gravy or the like, is added to the central cavity 14 of the fowl after one of the openings has been plugged and the other of the openings has been raised to a higher level than the first opening. In the most preferred method of roasting a fowl in accordance with this invention, the opening at the head end of the fowl is the one that is plugged and the opening at the tail end of the fowl is the one that is raised to a higher elevation prior to adding heated fluidic material to the interior of the fowl.

During the roasting process the presence of fluid in the interior of the fowl enables the interior section to be poached to obtain a desirable tender meat texture and flavor while the exterior of the fowl can be cooked to a crispy texture without causing interior dryness.

Referring now to FIG. 5, an alternate embodiment of the roasting support is generally indicated by reference number 40a. The roasting support 40a includes a base member 42a, a plug member 44a and a bracket means 60a. The base member 42a includes a pan member 46a having a peripheral flange 48a which is devoid of any of the apertures 74 of the embodiment of FIGS. 1-4. The base member 42a is, instead, provided with an upstanding, annular rim flange 90.

The bracket means 60a includes bracket members such as shown at 62a and 68a, which have their upper ends 70a welded or otherwise fixed to the undersurface of the base portion 50a of plug member 44a. The lower end portions 72a of bracket members 62a and 68a are welded or otherwise fixed to an annular ring 92 which is sized so as to seat upon the peripheral flange 40a, snugly fitting within the upstanding annular rim flange 90 of base member 42a. This arrangement allows the plug member 44a to be releasably supported by the base member 42a, in alignment therewith, during usage of the roasting stand 40, yet allows the parts to be easily separated for cleaning after usage.

It will be apparent from the foregoing description that this invention provides a method and apparatus for roasting fowl in an upright position in which fluids added to the interior of the fowl prior to roasting or generated therein during the roasting process are advantageously retained within the fowl. A further advantage is that heated air within the cooking environment cannot freely circulate in the interior of the fowl during the roasting process because one end of the fowl is plugged. Thus, upon completion of roasting, the exterior of the fowl can be crispy while the interior is tender and flavorful.

In view of the above, it will be seen that the several objects of the invention are achieved and other advantageous results attained.

As various changes can be made in the above constructions and method without departing from the scope of the invention, it is intended that all matter contained in the above description or shown in the accompanying drawings shall be interpreted as illustrative and not in a limiting sense.

What is claimed is:

1. A roasting support for a disemboweled fowl that has openings at the head and tail ends thereof, comprising a base member, a generally conical, generally imperforate plug member to prevent passage of fluid therethrough, having an apex portion, a base portion and a longitudinal axis, said plug member being carried by said base member with said apex portion extending upwardly therefrom and adapted to engage with one of said head and tail openings in said fowl for sealing said one opening to retain fluids within said fowl during roasting thereof, and support means extending from said plug member vertically higher than said plug member for supporting said fowl with the other of said openings at a higher elevation than said one opening during said roasting, whereby fluids added to the interior of said fowl or generated during roasting of said fowl are retained within the interior of said fowl during such roasting.

2. A roasting support according to claim 1, wherein said base member comprises a generally circular, generally imperforate pan member having a raised peripheral flange for retaining fluids that drip from the fowl during roasting thereof, said pan member having a diameter that is greater than the diameter of said base portion of said plug member, said roasting support further comprising bracket means connecting said pan member to said plug member for supporting said plug member above, and generally in vertical alignment with, said pan member.

3. A roasting support according to claim 2, wherein said bracket means is releasably attached to said pan member to permit separation of said pan member from said bracket means to facilitate cleaning of said pan member.

4. A roasting support according to claim 3, wherein said support means comprises an elongated arm mounted on the apex portion of said plug member and extending upwardly therefrom, said arm being constructed and arranged to be able to extend through the fowl being roasted to a predetermined point above the other of said openings.

5. A roasting support according to claim 2, wherein said support means comprises an elongated arm mounted on the apex portion of said plug member and extending upwardly therefrom to extend through the fowl being roasted to a predetermined point above the other of said openings.

6. A roasting support according to claim 5, wherein the cross-sectional shape of said plug member is generally triangular.

7. A roasting support according to claim 2, wherein the bracket means is releasably attached to said plug member to permit separation of said plug member from said bracket means to facilitate cleaning of said plug member.

8. A roasting support according to claim 7, wherein said support means comprises an elongated arm mounted on the apex portion of said plug member and extending upwardly therefrom to extend through the fowl being roasted to a predetermined point above the other of said openings.

9. A roasting support according to claim 8, wherein the cross-sectional shape of said plug member is generally triangular.

10. A roasting support according to claim 1, wherein said support means comprises an elongated arm mounted on the apex portion of said plug member and extending upwardly therefrom to extend through the fowl being roasted to a predetermined point above the other of said openings.

11. A roasting support according to claim 10, wherein the cross-sectional shape of said plug member is generally triangular.

12. A method of roasting a disemboweled fowl that has a generally hollow interior section and openings at the head and tail ends thereof, comprising the steps of supporting said fowl in an upright position in an oven such that one of the ends is higher than the other end, plugging the lower one of said openings to prevent leakage of fluids from the interior section of the fowl, and applying heat to said fowl for a sufficient period of time to roast said fowl.

13. A method of roasting a fowl according to claim 12, further including the step of adding heated fluidic material to the interior of said fowl after said lower one of said openings has been plugged and said other of said openings has been raised to a higher elevation than said lower one of said openings such that baking occurs at the exterior portion of the fowl and poaching occurs at the interior section.

14. A method of roasting a fowl according to claim 13, wherein said lower one of said openings is the opening at the head end of the fowl and said other of said openings is the opening at the tail end of the fowl.

15. A method of roasting a fowl according to claim 12, further including the step of adding liquid material to the interior of said fowl after said lower one of said openings has been plugged and said other of said openings has been raised to a higher elevation than said one of said openings such that baking occurs at the exterior portion of the fowl and poaching occurs at the interior section.

* * * * *